United States Patent Office 2,840,592
Patented June 24, 1958

2,840,592

PRODUCTION OF ACRYLONITRILE

Erwin L. Carpenter, Stamford, Conn., assignor to American Cyanamid Company, New York, N. Y., a corporation of Maine No Drawing. Application December 14, 1956
Serial No. 628,238

6 Claims. (Cl. 260—465.3)

This invention relates to the production of acrylonitrile by the catalytic reaction of acetylene and hydrocyanic acid. More particularly, it relates to a method for regenerating tar-bearing catalyst solution whereby said reaction results in substantially constant yield of acrylonitrile.

The commercial importance of acrylonitrile is well known. In the past few years, interest in acrylonitrile has expanded to a point where it has become one of the most important and promising organic chemical intermediates available. It is of particular utility in the manufacture of a wide range of products, for example, plastics, synthetic elastomers, synthetic fibers, soil conditions and the like.

Although the overall process for producing acrylonitrile by the catalytic reaction of acetylene and HCN has been improved on in various respects, the basic reaction employed is still that disclosed in Kurtz U. S. reissued Patent No. 23,265. As taught therein, the reaction is conducted in an aqueous acidic catalyst solution comprising, preferably, cuprous chloride as the catalyst and an ammonium or alkali metal chloride as a solubilizer therefor. When starting with a fresh catalyst solution, the catalyst activity is initially high but decreases as the reaction proceeds, it being reduced by as much as one-half within several weeks. This decrease in production rate or catalyst activity appears to occur for two principal reasons. First, as more fully described in U. S. Patent No. 2,688,632, ammonia is continually being formed by the hydrolysis of HCN, thereby altering the $NH_4Cl/CuCl$ ratio, and catalyst activity decreases as the latter increases. Second, organic by-products or "tars" are formed which apparently are complexes involving cuprous chloride so that some of the copper becomes unavailable for reaction with the acetylene or HCN. As the reaction proceeds, these tars gradually build up in the catalyst solution lowering the space-time yield of acrylonitrile. In due course, the solution becomes thick and heavy with tar.

To overcome this decrease in activity, the usual procedure has been to discard the old catalyst solution when it becomes too thick and the activity becomes too low. The copper content of the discarded catalyst has then been recovered by any of several methods. Among the latter, it has been proposed, for instance, to disperse the spent catalyst solution in water and treat with chlorine to put all copper in solution as cupric chloride. After separating the tar-containing solids, the copper is recovered by cementation. A modification of this procedure is to treat the spent catalyst solution with HCl and then recover the copper as cement copper after separating the tars. Another proposal involves boiling the spent solution to drive off water after which the residue is heated to convert the tars to carbon. The copper content is then leached with HCl and insoluble carbon separated.

These procedures have all demonstrated varying degrees of success, but each suffers from a similar drawback. In each procedure, a series of operations must be practiced, some of which are considerably involved before the copper is recovered and in condition for reuse. None proposes a simple, straightforward procedure for regenerating a tar-bearing catalyst solution.

It is a principal object of this invention to provide a simple procedure for regenerating tar-bearing catalyst solutions. It is a further object of this invention to provide a method for producing acrylonitrile by reacting HCN and acetylene in the presence of a cuprous chloride catalyst in which the catalyst activity is maintained at a high and substantially constant level in spite of the formation of tarry by-products. It is a still further object of this invention to provide such a method which is economical, involves a minimum of operations and requires a minimum of supervision when practiced.

In accordance with this invention, these objects have been met to a most surprising degree. In general, the process of this invention involves diluting a tar-bearing cuprous chloride catalyst solution with water whereby a major portion of the tar remains in solution while a major portion of the copper content precipitates, mainly as cuprous chloride with some cuprous cyanide. This precipitation is so surprisingly selective that the precipitated copper salts may be employed directly as catalyst after separation from the mother liquor without first being subjected to additional regeneration or purification steps. It is possible, therefore, by the unusually simple procedure of merely withdrawing catalyst solution from the HCN-acetylene reaction vessel, diluting it with water, and returning the precipitated copper salts to the catalyst solution in the reaction vessel, to maintain a desired tar content in said solution and, accordingly, a corresponding constant rate of acrylonitrile production.

The particular level or content of tar maintained in the catalyst solution may, of course, be widely varied by regulating the withdrawal rate of tar-bearing catalyst. Preferably, however, it should be sufficiently low so as to maintain a reasonably high space-time yield of acrylonitrile. In accordance with the process of this invention, a desirable level of tar in the catalyst solution has been found to be about 5–25% by weight of the catalyst solution. Such a level may be maintained by withdrawing catalyst solution, either continuously or periodically, at the ratio required for the particular level of tar selected.

However withdrawn, the catalyst stream is diluted with sufficient water to precipitate copper. The amount of dilution water employed may be varied considerably but the ratio of water to catalyst will usually be about 5–10:1 by volume. An amount of water providing a smaller ratio may not precipitate an optimum amount of copper while an amount providing a ratio greater than a 10:1 ratio appears to be of no particular added advantage. The precipitated copper will be in the form of cuprous chloride for the most part plus some cuprous cyanide, a by-product of the HCN-acetylene reaction. Precipitated copper constitutes some 80–95% of the dissolved copper content of the withdrawn catalyst stream while the tar content of the mother liquor constitutes some 80–90% of the original.

After separation of the copper precipitate by any means which forms no part of this invention, it may be returned directly to the main body of catalyst solution without the necessity of being first dried or otherwise treated to regenerate or purify it. However, losses occurring during dilution may require adjustments to the main body of catalyst. Thus, in order to maintain the original range of cuprous chloride concentration in the main body of catalyst, it will be necessary to provide additional copper to replace that lost in the mother liquor. This copper is preferably in the form of cuprous chloride but it may just as well be added as any of various other compounds such as cupric chloride, cupric acetate, cupric formate, cuprous cyanide, and the like. Similarly, the original NH₄Cl:CuCl ratio may have been altered by the withdrawal of catalyst solution. Ammonium chloride may have been lost by remaining in solution in the mother liquor to the extent that an addition must be made to maintain the original NH₄Cl:CuCl ratio. If copper and NH₄Cl adjustments are required, the necessary additions may be made directly to and returned with the precipitated copper to the catalyst solution. Alternatively, they may be made separately to the main body of the catalyst solution. It may also be desirable to add water to the precipitated copper to compensate for that withdrawn from the main body of the catalyst solution, if this is not otherwise provided for as by the continuous addition of water or steam to the catalyst solution to maintain the volume thereof substantially constant.

The mother liquor from the copper precipitation step contains most of the tars and some of the original copper content. How this is disposed of forms no part of this invention. An obvious disposition, however, is to treat the liquor to recover the remaining copper content by any of various methods as, for instance, those considered previously.

The following example illustrates the invention.

*Example 1*

A catalyst solution was made up consisting of 28.6% copper as cuprous chloride and 6.1% NH₃ as NH₄Cl, the remainder being water. This catalyst was then operated to produce acrylonitrile by adding acetylene and HCN to the solution in a ratio of eight volumes of acetylene to one of HCN. Initially, the activity of this catalyst was such as to produce 39.2 grams of acrylonitrile per liter per hour of operating time. During the first few days of operation, no catalyst was withdrawn for regeneration purposes, and the tar content gradually increased to a concentration of about 7% by weight. During this time, the activity of the catalyst decreased to 34.2 grams of acrylonitrile per liter per hour. Thereafter, catalyst was withdrawn 0.0067 liter per liter of catalyst solution per hour and water added thereto in the ratio of 6 volumes of water to one of catalyst so as to precipitate a mixture of CuCl and CuCN. These salts were allowed to settle and the mother liquor separated by decantation. The salt slurry remaining was then returned directly to the catalyst solution without any further purification. A constant catalyst composition was maintained by adding NH₄Cl, HCl, H₂O and CuCl to the catalyst solution thereby compensating for losses sustained in the regeneration. Over a further period of eight months, the tar level of the catalyst remained constant at about 7% and the activity remained constant at 34.0–34.5 gms./l./hr.

I claim:

1. In the preparation of acrylonitrile by the reaction of acetylene and HCN in the presence of an aqueous acidic catalyst solution containing cuprous chloride in which tarry by-products are produced, the method for regenerating catalyst solution which comprises: diluting catalyst solution with water whereby copper is precipitated as cuprous chloride and cuprous cyanide, and tarry by-products remain in solution; and collecting said precipitate without further purification for use as catalyst.

2. A process of continuously producing acrylonitrile by the reaction of acetylene and HCN in the presence of a body of an aqueous acidic cuprous chloride catalyst solution in which tarry by-products are produced which comprises: withdrawing catalyst solution from said body; diluting the same with water, whereby copper is precipitated as cuprous chloride and cuprous cyanide, and tarry by-products remain in solution; separating it without further purification and returning said precipitate to said body of catalyst solution.

3. A process according to claim 2 in which catalyst solution is withdrawn at a rate such as to maintain a tar content in said body of catalyst solution of about 5–25%.

4. A process according to claim 2 in which a copper compound in addition to that in the copper precipitate is added to said body of catalyst solution so that the amount of copper returned is substantially equivalent to that withdrawn.

5. A process according to claim 2 in which ammonium chloride is returned to said body of catalyst solution in amount sufficient to maintain the NH₄Cl:CuCl ratio substantially constant.

6. A process according to claim 2 in which the withdrawn catalyst solution is diluted with water in a ratio of 5–10:1 by volume.

References Cited in the file of this patent

UNITED STATES PATENTS

| | | |
|---|---|---|
| 2,632,737 | Stehman | Mar. 24, 1953 |
| 2,688,632 | Carpenter et al. | Sept. 7, 1954 |
| 2,748,157 | Taylor | May 29, 1956 |
| 2,763,676 | Porret | Sept. 18, 1956 |
| 2,778,847 | Fujisaki et al. | Jan. 22, 1957 |